United States Patent
Chapman et al.

(10) Patent No.: US 8,100,591 B2
(45) Date of Patent: Jan. 24, 2012

(54) DUAL LOOP CAMERA STABILIZATION SYSTEMS AND METHODS

(75) Inventors: Leonard T. Chapman, North Hollywood, CA (US); Stanislov Gorbatov, Los Angeles, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 12/780,793

(22) Filed: May 14, 2010

(65) Prior Publication Data

US 2011/0280565 A1  Nov. 17, 2011

(51) Int. Cl.
*G03B 17/00* (2006.01)
(52) U.S. Cl. .......................................... 396/428
(58) Field of Classification Search .................. 396/419, 396/428, 421; 348/722
See application file for complete search history.

(56) References Cited

U.S. PATENT DOCUMENTS

| | | | | |
|---|---|---|---|---|
| 2,618,209 A * | 11/1952 | Silent | ................ | 396/93 |
| 4,943,019 A * | 7/1990 | Mester | ................ | 248/123.11 |
| 5,197,700 A * | 3/1993 | Chapman | ................ | 248/125.1 |
| 7,209,176 B2 * | 4/2007 | Chapman | ................ | 348/373 |
| 7,252,441 B2 * | 8/2007 | Chapman | ................ | 396/428 |
| 7,311,452 B2 * | 12/2007 | Chapman | ................ | 396/428 |
| 2003/0096587 A1 * | 5/2003 | Wildhagen | ................ | 455/234.2 |
| 2005/0052531 A1 * | 3/2005 | Kozlov et al. | ................ | 348/143 |
| 2007/0050139 A1 * | 3/2007 | Sidman | ................ | 701/220 |
| 2007/0182813 A1 * | 8/2007 | Kozlov et al. | ................ | 348/61 |
| 2008/0002967 A1 * | 1/2008 | Chapman | ................ | 396/428 |

\* cited by examiner

*Primary Examiner* — Clayton E LaBalle
*Assistant Examiner* — Warren K Fenwick
(74) *Attorney, Agent, or Firm* — Kenneth H. Ohriner; Perkins Coie LLP (57) ABSTRACT

A method for stabilizing a camera platform includes generating a first signal from a platform sensor, such as a gyro sensor, on the camera platform indicative of a change in angular position of the camera platform. The first signal is added to a control signal provided from a camera platform position controller, typically operated by the camera operator. A first correction value based on the sum of the first signal and the control signal is calculated. A second correction value is calculated based on a signal from an encoder associated with a motor linked to the camera platform. Adding the first correction value and the second correction value provides a motor control signal which is amplified and used to control the motor.

10 Claims, 8 Drawing Sheets

DUAL LOOP CAMERA STABILIZATION SYSTEMS AND METHODS

BACKGROUND

The field of the invention is stabilized platforms and systems for cameras.

In motion picture, television or video filming or recording, the camera is often supported on a vehicle, to follow an action or moving sequence to achieve a desired camera angle or effect, or to film occupants in or on the vehicle. Various specialized camera cars, camera trucks, cranes, and dollies have been used for this purpose.

It is important for the camera to be maintained in a stable position. In the most basic form, camera stability has been achieved by mounting the camera on a tri-pod. However, when the camera is mounted on and moves with a vehicle, maintaining camera stability often becomes difficult. For example, with a camera mounted on a camera car moving along a roadway and filming or recording a fixed subject on the ground, e.g., a building, or a subject which is also moving e.g., another moving vehicle, the lens of the camera will necessarily move in unintended and undesirable ways, due to various factors. These factors may include changes in the roadway direction or inclination, changes in the vehicle orientation, due to shifting gravitational or inertial loads, as well as for other reasons. The undesirable camera lens movement resulting from these factors reduces the quality of the filmed or recorded images, by causing the images to be improperly framed, or to appear jumpy or erratic.

Various systems have been used to provide a stable camera platform. These include gyro-stabilized camera heads which reduce or avoid unwanted movement of the lens, while also allowing the lens to aimed as desired about two or three axes. The axes of lens movement are generally referred to as the pan and tilt axes, with the third axes, if used, being a roll axis. Pan movement refers to a change in azimuth. Tilt movement refers to change in the lens angle of elevation. Roll movement refers to movement about an axis co-linear with or parallel to the axis of the lens. Typically, camera stabilization systems use sensors on a camera head connected to a controller. The controller controls electric motors based on outputs from the sensors, to try to keep the camera platform is a stable angular position relative the pan, tilt and roll axes. Although existing camera stabilization systems have performed with varying degrees of success, various engineering challenges remain in providing precise and consistent stabilization control of camera platforms.

SUMMARY OF THE INVENTION

In one aspect of the invention, a system for stabilizing a camera platform has a pan frame pivotally attached to a support, such as a crane arm. A tilt frame is pivotally attached to the pan frame. A sensor is located on a camera platform of the tilt frame for sensing a change in angular position about the tilt axis. A tilt axis motor is linked to the camera platform. A control system includes a first feedback loop including the sensor, a tilt axis amplifier, the tilt axis motor, and a tilt axis first error calculator that receives the sum of an output from the platform sensor and a platform tilt position controller. The platform tilt position controller may be a hand wheel set that the camera operator uses to aim the camera. A second tilt axis feedback loop of the control system includes a tilt axis motor encoder, the tilt axis amplifier, the tilt axis motor, and a tilt axis second error calculator receiving an output from the tilt axis encoder. The tilt axis amplifier drives the tilt axis motor based on the amplified sum of the calculated first and second error values. This same concept may be similarly used in the same way for stabilization about the pan axis and about the roll axis.

A method for stabilizing a camera platform advantageously includes generating a first signal from a platform sensor on the camera platform indicative of a change in angular position of the camera platform. The first signal is added to a control signal provided from a camera platform position controller, typically operated by the camera operator. A first correction value based on the sum of the first signal and the control signal is calculated. A second correction value is calculated based on a signal from an encoder associated with a motor linked to the camera platform. Adding the first correction value and the second correction value provides a motor control signal which is amplified and used to control the motor.

Other objects and advantages will appear below. The invention resides as well in subsystems and sub combinations of the elements and steps described.

BRIEF DESCRIPTION OF THE DRAWINGS

In the drawings, the same element number indicates the same element in each of the views.

DETAILED DESCRIPTION OF THE DRAWINGS

Figure 1:
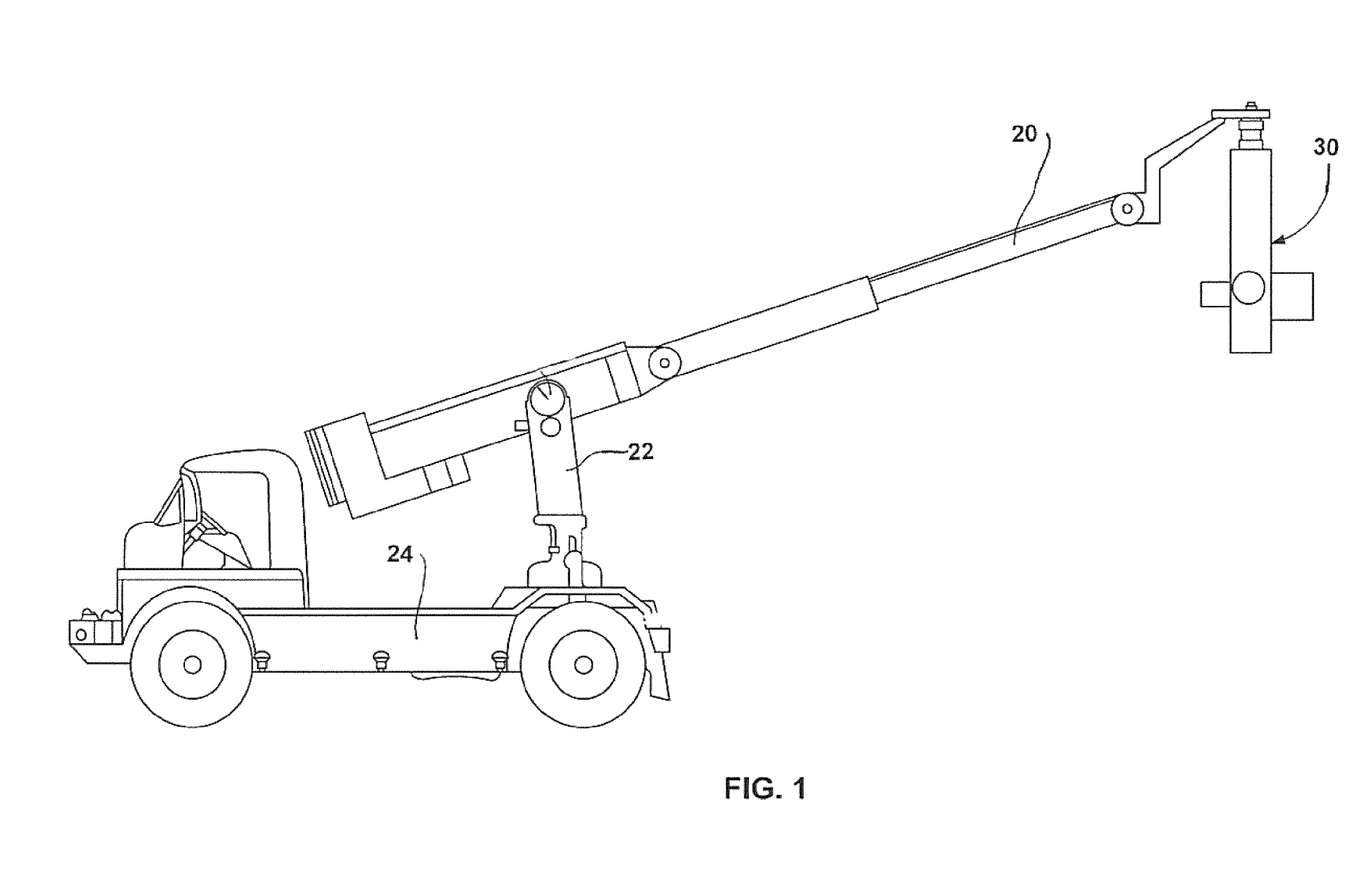
FIG. 1 is a side view of a camera crane having a camera head including a new stabilization and control system.

FIG. 1 shows an example of a set up for use of the new camera head 30. As shown in FIG. 1, the camera head 30 may be attached to a crane arm 20. The crane arm is typically supported on a U-frame 22 which allows the arm 20 to pivot vertically while the U-frame itself can pivot horizontally on a vehicle or mobile base 24. The crane arm may be a fixed length arm, or it may be a telescoping or extending arm.

Figure 2:
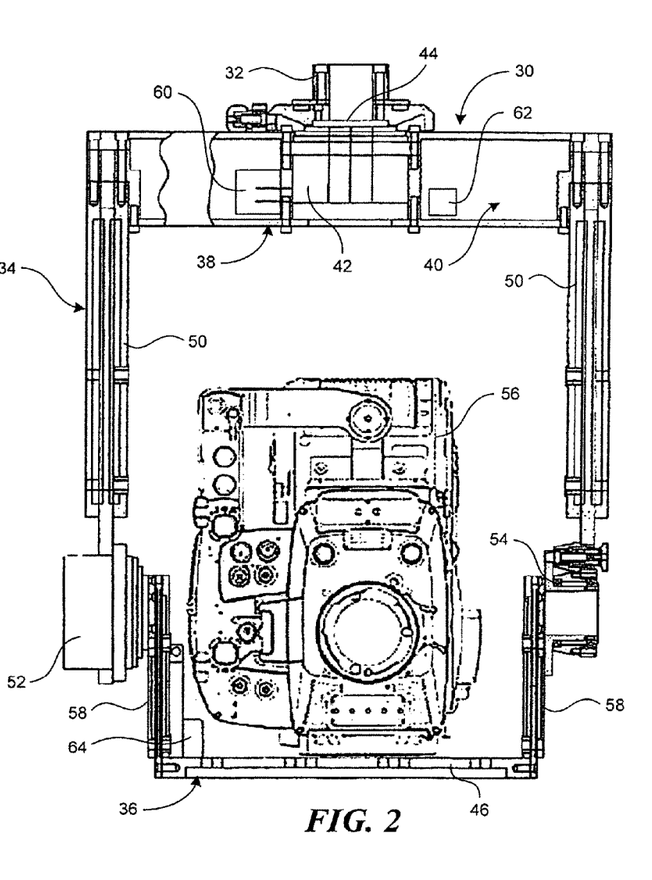
FIG. 2 is a front view of the camera head shown in FIG. 1, with a camera installed on the camera head.
Figure 3:
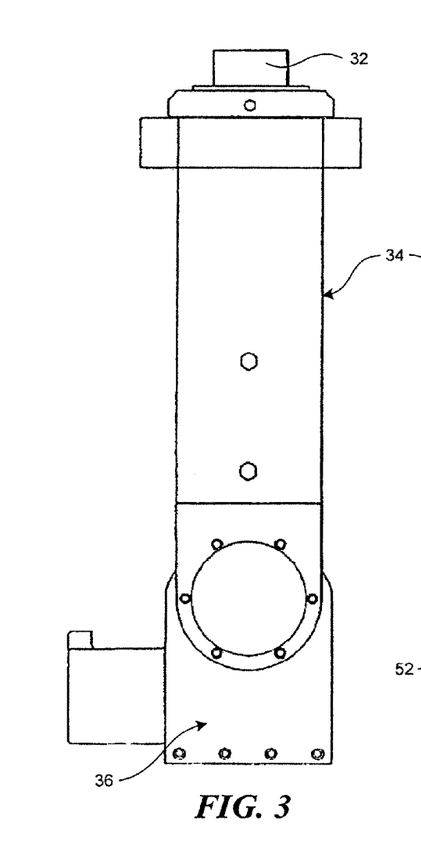
FIG. 3. is a side view of the camera head shown in FIG. 2.

Turning to FIGS. 2 and 3, the head 30 includes a head housing or frame 38 pivotally supported on a hub 32. Ordinarily, the hub 32 is securely attached to the crane arm 20 or other support structure. The head housing 38 and pan arms 50 form a pan frame 34. A camera platform or mounting plate 46 and tilt arms 58 form a tilt frame 36 that is pivotally attached to the pan frame 34. The pan frame 34 is pivotable about a vertical pan axis while the tilt frame 36 is pivotable about a horizontal tilt axis. This provides a two axis head, as described for example in U.S. patent application Ser. No. 12/773,327, filed May 4, 2010 and incorporated herein by reference.

The head housing 38 may form an enclosure 40 containing head components. A pan axis motor 42 may be provided in the enclosure 40, with the shaft of the pan motor 42 attached to the hub 32. An electronic computer controller 60 and a pan axis sensor 62 may also be provided in the enclosure 40. The pan axis sensor 62 may be a gyro-sensor that senses angular movement of the pan head 30. The tilt frame 36 is supported on bearings 54 at the lower ends of the pan arms 50. A tilt motor 52 is attached to one of the pan arms 50, with the shaft of the tilt motor 52 attached to the tilt frame 36. A tilt axis sensor 64 senses movement of the tilt frame. Actuation of the pan motor 42 causes the pan frame 34 to pivot left/right about the hub 32. Actuation of the tilt motor 52 causes the tilt frame to pivot up/down relative to the pan frame. The enclosure may be made watertight so that the head 30 may be used in wet environments or for underwater filming.

The camera head 30 is a substantially rigid structure. The housing of the pan motor 42 (or the shaft of the pan motor, depending on the design) is rigidly attached to and pivots with the pan frame 34. Similarly, the shaft of the tilt motor 52 (of the housing of the tilt motor, depending on the design) is rigidly attached to and pivots with the tilt frame 36. However, it has now been discovered that even with rigidly built camera heads, the motor shaft and the camera platform do not move together. Rather, there is a slight lag or delay between movement of the motor shaft and movement of the camera platform. This delay occurs because while the torsional moment of inertia of the mechanical linkage between the motor shaft and the camera platform may be high, there is still a small amount of elastic strain or windup. In highly precise stabilization systems, the delay can result in erroneous feedback correction, instability and resonance of the mechanical system or linkage. These factors degrade the performance of the stabilization system. The delay is proportional to the torque applied by the motor. Accordingly, in a high gain system where higher torque is applied to try to achieve fast corrective movements, the delay and the disadvantages caused by the delay are greater.

Based on this realization, the inventors have further determined that motor or shaft encoders are not necessarily accurate indicators of the actual position of the pan frame 34, the tilt frame 36 or the camera mounting plate 46. This has further lead the inventors to the concept that improved results can be achieved by sensing movement or position of a head component, such as the camera mounting plate 46, via a sensor located on the camera mounting plate, as well as sensing the position of the motor shaft. By sensing the position of both the motor shaft and the camera platform, the electronic or computer controller of the stabilization system can operate at high gain and provide fast corrective movements, with the system remaining stable. Resonance of the camera platform is avoided. Since the delay can now be detected, the controller can be programmed to compensate for it. The controller operates an algorithm that calculates the difference in position between the motor shaft and the camera platform, and then uses the difference in calculating the instantaneous current applied to the motor. The inventors have developed a dual loop feedback control system based on this concept.

Figure 4:
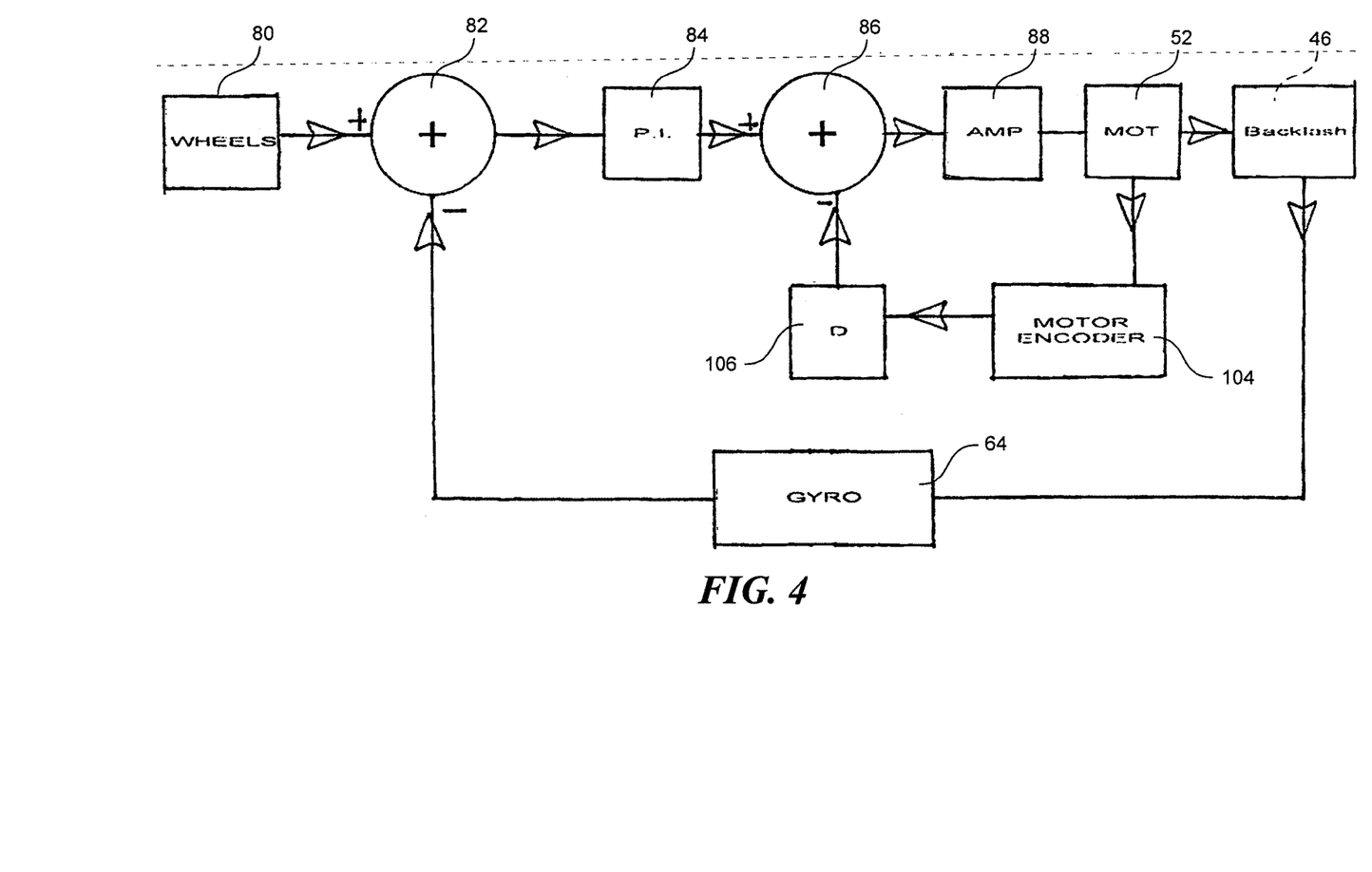
FIG. 4 is a schematic diagram of a control system for use in the camera head shown in FIGS. 1-3.

Turning to FIG. 4, the dual loop feedback control system for the tilt frame 36 is described. A sensor such as a gyro sensor 64 is mounted on the camera mounting plate 46. Movement of the camera mounting plate 46 about the tilt axis causes the sensor 64 to output a signal to a first summing circuit 82. The first summing circuit 82 adds the output signal from the sensor 64 to a control signal from head controller 80. The head controller 80 is used by the camera operator to aim the camera as desired. The summing circuit output signal is provided to a proportional/integral controller 84 which calculates a proportional/integral error signal, based on the input it receives from the first summing circuit 82. The proportional/integral or first correction signal is input into a second summing circuit 86 and then to an amplifier 88 which drives the tilt motor 52. This forms the first feedback control loop. Element 46 in FIG. 4 is shown with a dotted line to the box labeled "Backlash" to show that the motor shaft and the camera mounting plate 46 are not necessarily consistently at the same precise angular position.

The proportional/integral controller 84 calculates a proportional error value based on the difference between the desired or intended position of the camera mounting plate 46, and the current actual position of the camera plate as detected by the sensor 64. The proportional/integral controller also calculates an integral error value based on the sum of recent proportional error values. These values may then be weighted and combined to provide the first correction signal.

An encoder 104 on the shaft of the motor 52 senses the angular position or movement of the motor shaft and generates a corresponding motor shaft signal. The motor shaft signal is output to a derivative controller 106 which calculates a second correction signal. The second correction signal may be the derivative of the motor shaft signal. The second correction signal is input to the second summing circuit 86 where the first and second correction signals may be weighted and then added together to create a motor control signal. The motor control signal is amplified and used to drive the motor 52. The second feedback loop accordingly includes the motor encoder 104, the derivative controller 106, the second summing circuit 86, the amplifier 88 and the motor 52. The controllers 84 and 104, and optionally the summing circuits as well may be provided in a single module controller 60. For example, a controller from Galil Motion Control, Rocklin, Calif. is available with a proportional/integral/derivative controller and may be used.

Figure 5:
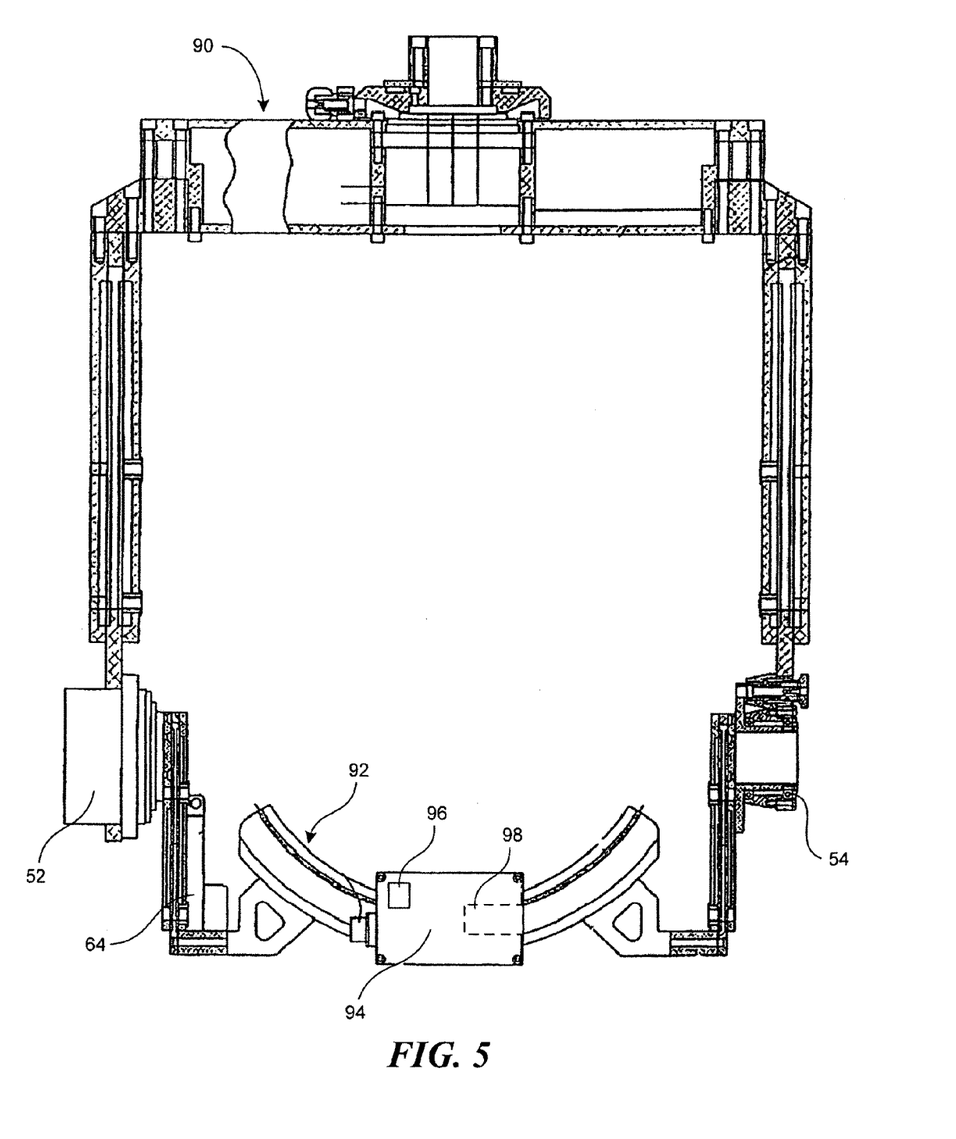
FIG. 5 is a front view of an alternative camera head design similar to the design shown in FIG. 2 but further including a roll axis frame, to provide a three axis camera head.

The description above may similarly be used on the pan axis. FIG. 4 shows a three axis camera head which may be similar to the two axis design in FIG. 2, but with the camera mounting plate 46 replaced with a roll axis unit. The roll axis unit may include a curved track 92. A roll motor housing 94 includes a roll axis motor 98 (or a pair of motors) for moving the housing 94 along the track 92, to provide roll axis movement. A top surface of the roll motor housing 94 may be used as a camera mounting plate. A roll axis sensor 96 is provided on or in the roll motor housing 94. The roll axis sensor 96 may be a gyro sensor or a MEMS sensor. A flex cable runs from the controller 60 to the roll motor housing 94 to provide power and signal connections. The pan and tilt axis motors and sensors are also connected to the controller 60, with the wiring connections omitted from the drawings for clarity of illustration.

Alternative positions of the motors 42, 52 and 98 can of course be used, with either the motor shaft or the motor housing being fixed in place relative to the other. The motors may be harmonic drive motors to provide zero backlash and high reduction ratios.

The control system shown in FIG. 4 may optionally be operated purely in an encoder mode where the sensors 62, 64 and 96 are not used. In the encoder mode, feedback from the encoder is provided to the controller 60 which calculates a single correction signal. The single correction signal is amplified and used to drive the motor.

The controller 60 and the dual loop control system shown in FIG. 4 may also include adjustable electronic dampening. The dampening may be preset based on motor characteristics, the structural characteristics of the head 30, and/or the payload (camera 56 plus accessories, if any) carried on the head. The controller 60 may also include drift compensation. Drift is slow and undesired movement occurring over relatively longer periods of time (typically several minutes or hours) due to tolerances in the control system and/or external factors. The controller 60 may detect and compensate for drift.

A memory function may also be included in the controller 60. The memory function allows programmed head movements to be uploaded and stored in the controller 60. The controller may then recall and execute the programmed head movements as desired. This allows a specific sequence of head movements to be precisely repeated. The controller 60 may alternatively record head movements as they occur, and store the movements in memory for later use.

The dual loop system shown in FIG. 4 splits the proportional/integral/derivative (PID) feedback function into two separate subsystems. The proportional and integral functions operate on a signal from the gyro (or other sensor) on the camera platform, forming a main feedback loop. The derivative function operates on a signal from the motor shaft encoder, forming a secondary feedback loop. This secondary loop allows the main feedback loop to operate at a higher gain for increased torque applied to the camera platform. This results in fast corrective movements and more precise control of the position of the camera platform. Without the secondary loop, the system would tend to oscillate, especially at a high gain, due to the delay between shaft movement and camera platform movement.

The dual loop control system may also be used in other camera stabilization applications apart from camera heads. For example, the dual loop control system may also be used on other types of camera supports, such as camera cranes and camera dollys. U.S. Pat. No. 7,128,479 and U.S. patent application Ser. Nos. 12/537,200; 12/706,805; and 12/761,199, each incorporated by reference, describe a camera crane having a valve which controls operation of hydraulic cylinders. The hydraulic cylinders drive telescoping movement of the crane arm. The shaft of an electric motor is linked to the shaft of the hydraulic valve. Due to torsional flexing of the shaft linkage, there is a delay between movement of the motor shaft and movement of the valve shaft. The disadvantages to the control system resulting from this delay are the same as described above. Control of the camera crane is improved by sensing the position of the motor shaft with a first sensor and also sensing the position of the valve shaft with a second sensor, to allow for detection of and compensation for the delay be the control system.

In a camera crane application, a motor shaft sensor or encoder is associated with the motor shaft to sense the motor shaft position or a change in angular position of the motor shaft. A valve shaft sensor or encoder is associated with the valve shaft to sense the valve shaft position or a change in angular position of the valve shaft. The first feedback loop includes the motor shaft sensor, an amplifier, the motor, and a proportional and integral error calculator receiving the sum of an output from the valve shaft sensor and a valve controller. A second feedback loop includes the motor shaft sensor or encoder and a derivative calculator receiving an output from the motor shaft encoder. The amplifier drives the motor based on the amplified sum of the output from the derivative calculator and the proportional and integral error calculator.

FIGS. 6-11 show a three axis wheel controller assembly 80 which may be used with the head 30 and control systems described above. The wheel controller assembly 80 may be used by the camera operator to control the head 30 to aim the camera 56 as desired. The wheel controller assembly 80 may be mounted on the vehicle 24 or used as a stand alone unit. The wheel controller assembly 80 is linked to the head via a cable or through a wireless connection. A remote monitor 206, if used, is linked to the camera and displays the image recorded by the camera.

Figure 6:
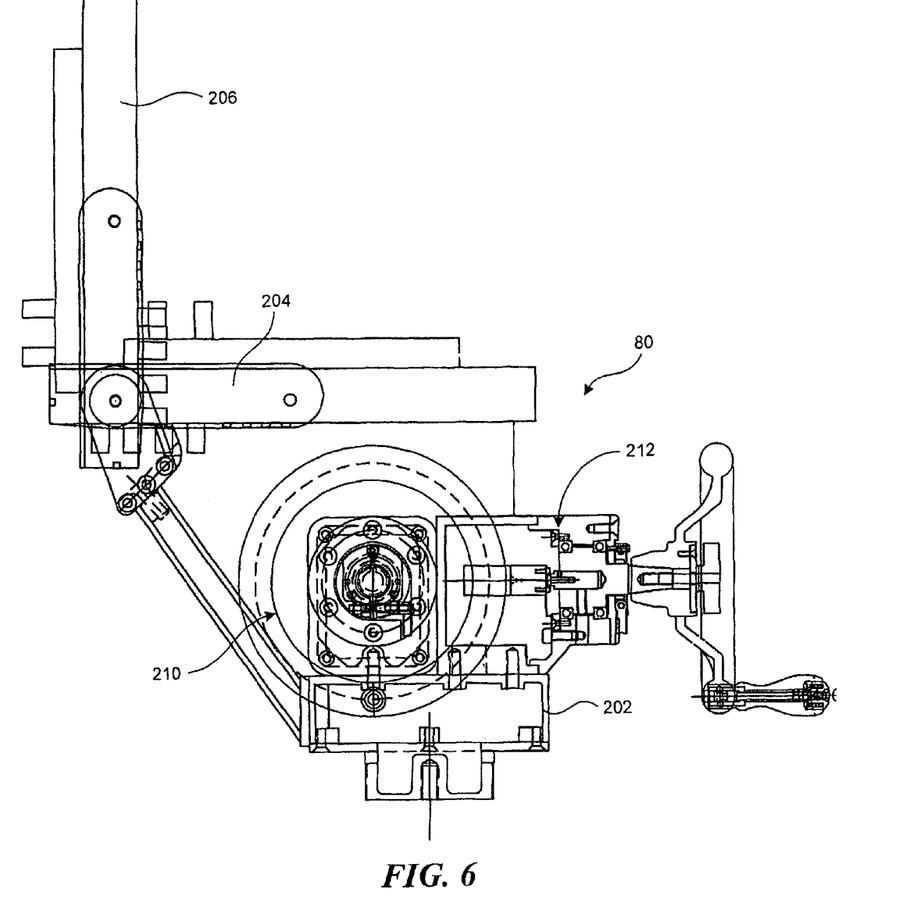
FIG. 6 is a side view of wheel controller.
Figure 7:
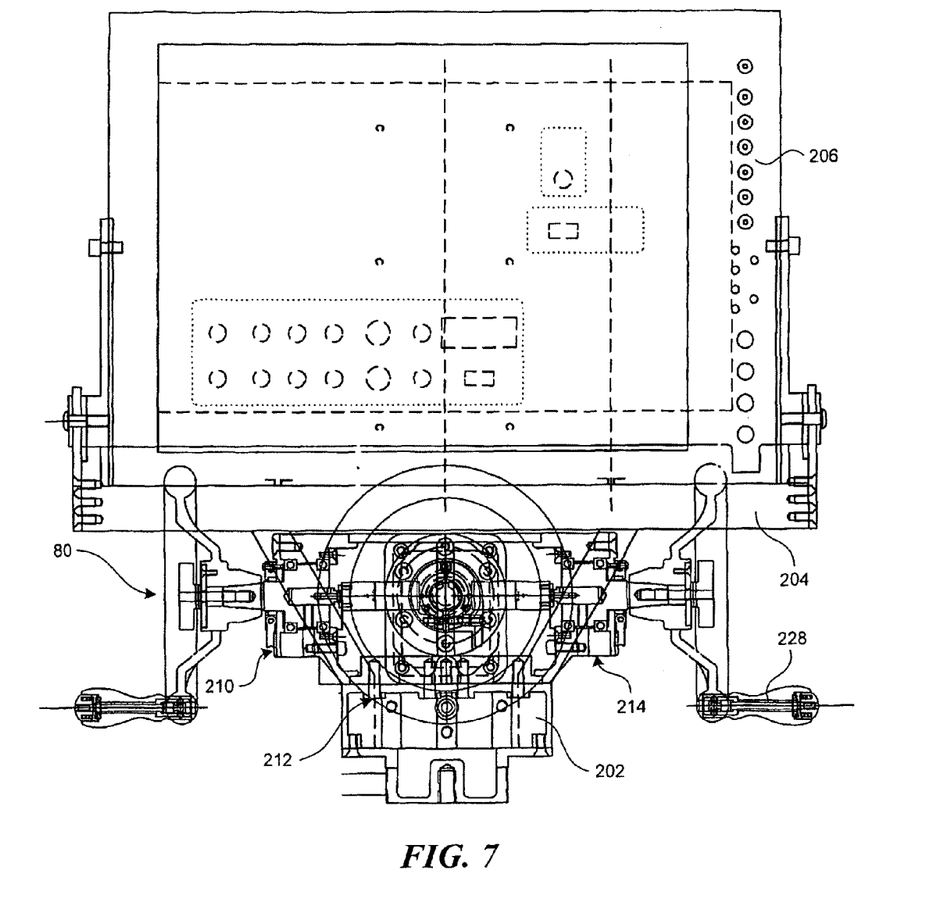
FIG. 7 is a front view of the wheel controller shown in FIG. 6.
Figure 8:
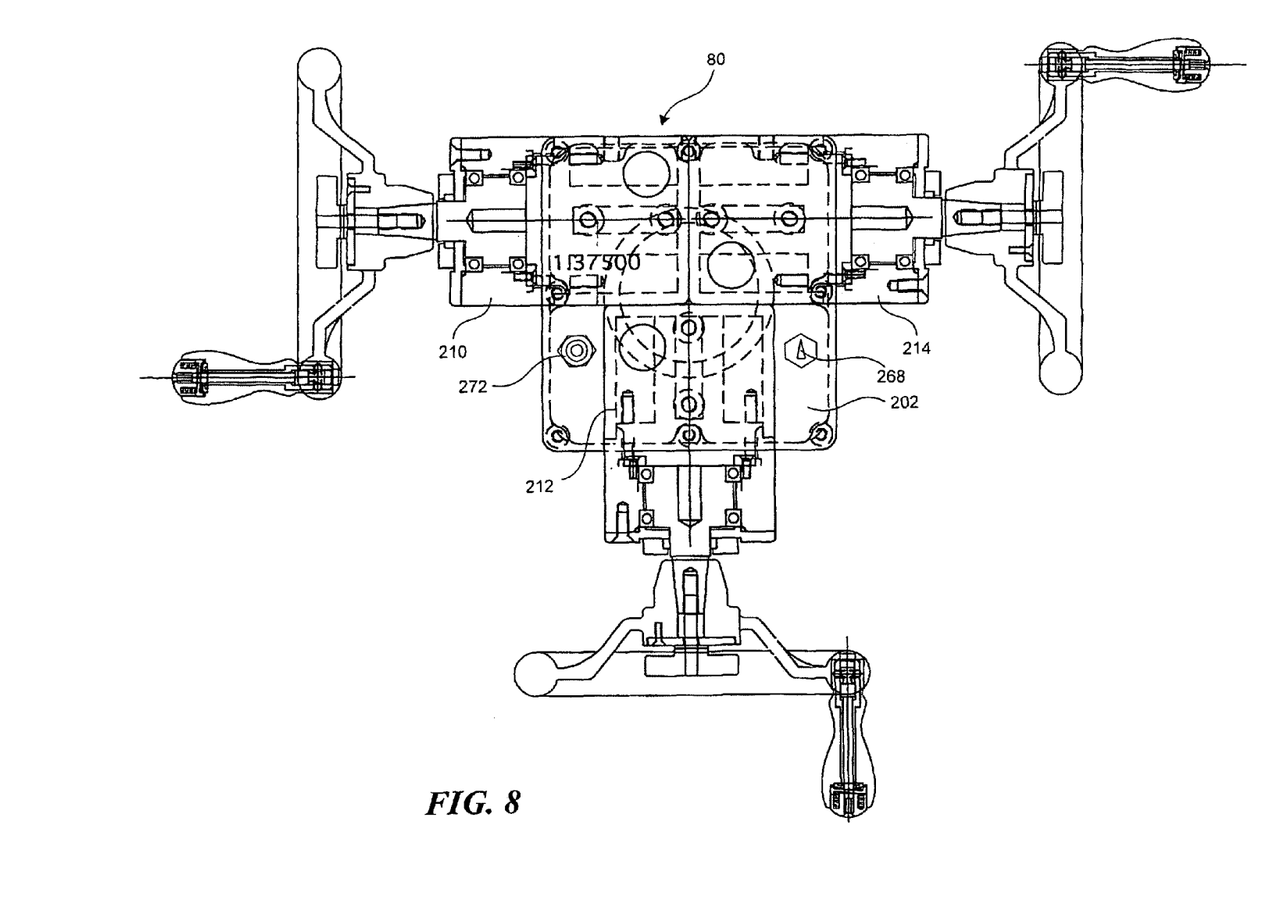
FIG. 8 is a partial top view of the wheel controller shown in FIG. 6.

As shown in FIGS. 6 and 7, the wheel controller unit 80 has a pan axis control unit 210, a tilt axis control unit 212 and a roll axis control unit 214 supported on a base 202. The wheel controller assembly 80 may optionally also include a stand or platform for holding a monitor 206. As shown in FIG. 8, the pan control unit 210 is parallel to and aligned back-to-back with the roll axis unit 214. The tilt axis unit 212 is perpendicular to the pan and roll axis units, and generally centered on them. Also as shown in FIG. 8, a reset switch 268 may be provided on the assembly 80. An I/O connector 272 may also be provided to allow the controller assembly 80 to connect with other equipment, such as a computer.

Figures 9, 10:
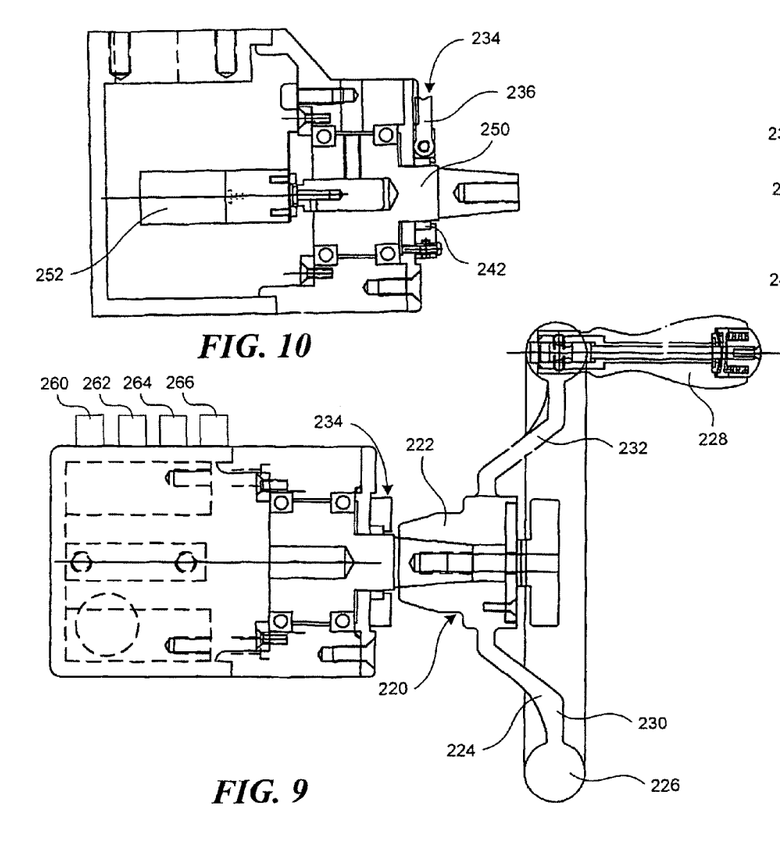
FIG. 9 is a side view of one of the controller units of the wheel controller shown in FIG. 6.
FIG. 10 is a top view of the controller unit shown in FIG. 9.
Figure 11:
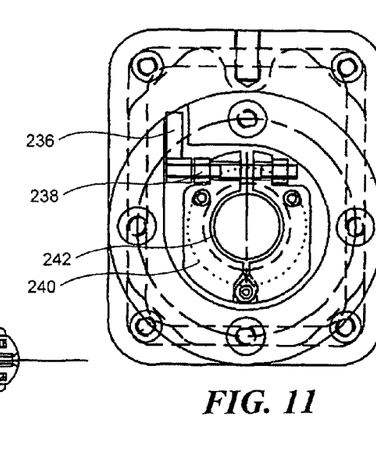
FIG. 11 is a front view of the controller unit shown in FIG. 9.

The control units 210, 212, and 214 may be the same, with each control unit otherwise set up to control movement of the head in one of the three axes. FIGS. 9-11 show a control unit, which may be used for the pan, tilt or roll control units. As shown in FIG. 9, a handle 228 is rotatably attached to the rim 226 of a wheel 220. A flange 224 extends from a handle hub 222 to the rim 226. The handle 228 would ordinarily shift the balance of the wheel off center. However, the flange is made thicker at areas 224 opposite from the handle 228, and the flange is made thinner at areas 232 adjacent to the handle 228. This keeps the wheel balanced. The rim 226 may be made uniform all around, since the rim is handled by the user and advantageously should provide a uniform grasping surface.

The control unit may include potentiometers to adjust various controls. These may include a speed adjustment 260 which adjusts the ratio between movement of the wheel 220 and movement of the corresponding frame of the head. A dampening adjustment 262 may also be provided to adjust dampening of head movements. Increased dampening smoothes out starting and stopping movements. A limit set switch 264 can be used to set end or stop positions. A direction switch 266 can be used to reverse the direction of head movement relative to the wheel movement.

The control unit may include a drag assembly 234 to add drag to movement of the wheel 220. In general, the wheel 220 can turn relatively freely, as the shaft 250 is mounted on bearings. This allows the wheel to be turned with a very slight hand or finger movement. Some camera aiming movements however may be more easily carried out with more drag on the wheel. In addition, as a matter of personal preference, some camera operators may prefer more drag. As shown in FIGS. 10 and 11, a split clamp ring 240 surrounds the shaft 250. A pin extends through the upper ends of the split clamp ring 240 and is attached to a cam 238. A lever 236 is engaged with the cam 238. With the lever 236 in the up position as shown in FIG. 11, the drag assembly 234 is disengaged and adds no drag to turning movement of the shaft 250. To add drag, the lever 236 is pulled down. This requires only a light and short finger movement by the operator. Moving the lever down causes the cam to move the sides of the clamp ring 240 towards each other. This in turn brings an o-ring into contact with the shaft 250, creating a uniform amount of added drag on rotation of the wheel 220.

Thus, novel apparatus and methods have been shown and described. Various modifications and substitutions may of course be used without departing from the spirit and scope of the invention. The invention, therefore, should not be limited, except to the following claims and their equivalents.

The invention claimed is:

1. A system for stabilizing a camera platform, comprising:
a platform sensor on the camera platform for sensing a change in angular position of the camera platform;
a platform position controller;
a motor having a motor shaft linked to the camera platform;
an encoder on the motor shaft;
a first feedback loop including the platform sensor, an amplifier, the motor, and a proportional and integral error calculator receiving the sum of an output from the platform sensor and the platform position controller; and
a second feedback loop including the encoder, the amplifier, the motor, and a derivative calculator receiving an output from the encoder;
with the amplifier driving the motor based on the amplified sum of the output from the derivative calculator and the proportional and integral error calculator.

2. The system of claim 1 wherein the platform sensor comprises a gyro sensor sensing a tilt angle of the camera platform.

3. The system of claim 1 with the platform position controller comprising a handwheel.

4. The system of claim 1 with the platform sensor comprising a gyro sensor.

5. The system of claim 1 with the proportional and integral error calculator and the differential calculator included in a single module.

6. A system for stabilizing a camera platform movable about a pan axis and a tilt axis, comprising:
a pan frame pivotally attached to a support;
a tilt frame pivotally attached to the pan frame;
a camera platform on a tilt frame;
a platform sensor on the camera platform for sensing a change in angular position of the camera platform about the tilt axis;
a platform tilt position controller;
a tilt axis motor having a motor shaft linked to the camera platform;
a tilt axis motor encoder on the tilt axis motor shaft;
a first tilt axis feedback loop including the platform sensor, a tilt axis amplifier, the tilt axis motor, and a tilt axis proportional and integral error calculator receiving the sum of an output from the platform sensor and the platform tilt position controller; and
a second tilt axis feedback loop including the tilt axis motor encoder, the tilt axis amplifier, the tilt axis motor, and a tilt axis derivative calculator receiving an output from the tilt axis encoder;
with the tilt axis amplifier driving the tilt axis motor based on the amplified sum of the output from the tilt axis derivative calculator and the tilt axis proportional and integral error calculator;
a pan axis sensor on the pan frame for sensing a change in angular position of the pan frame about the pan axis;
a pan axis position controller;
a pan axis motor having a motor shaft linked to the support;
a pan axis motor encoder associated with the pan axis motor;
a first pan axis feedback loop including the pan axis sensor, a pan axis proportional and integral error calculator receiving the sum of an output from the pan axis sensor and the pan axis position controller, a pan axis amplifier and the pan axis motor; and
a second pan axis feedback loop including the pan axis motor encoder, the pan axis amplifier, the pan axis motor, and a pan axis derivative calculator receiving an output from the pan axis motor encoder;
with the pan axis amplifier driving the pan axis motor based on the amplified sum of the output from the pan axis derivative calculator and the pan axis proportional and integral error calculator.

7. The system of claim 6 with the platform tilt position controller and the pan axis position controller comprising tilt and pan axis handwheels rotatable about perpendicular axes.

8. The system of claim 6 further comprising:
a roll frame pivotally attached to the tilt frame, with the camera platform on the roll frame;
a roll axis platform sensor on the camera platform for sensing a change in angular position of the camera platform about the roll axis;
a roll axis position controller;
a roll axis motor having a roll axis motor shaft linked to the camera platform;
a roll axis motor encoder on the roll axis motor shaft;
a first roll axis feedback loop including the roll axis platform sensor, a roll axis amplifier, the roll axis motor, and a roll axis proportional and integral error calculator receiving the sum of an output from the roll axis platform sensor and the roll axis position controller; and
a second roll axis feedback loop including the roll axis motor encoder, the roll axis amplifier, the roll axis motor, and a roll axis derivative calculator receiving an output from the roll axis encoder;
with the roll axis amplifier driving the roll axis motor based on the amplified sum of the output from the roll axis derivative calculator and the roll axis proportional and integral error calculator.

9. The system of claim 8 with the platform tilt position controller, the pan axis position controller, and the roll axis position controller comprising tilt, pan and roll handwheels rotatable about mutually perpendicular axes.

10. A system for stabilizing a camera platform, comprising:
a platform sensor on the camera platform;
a platform position hand controller;
a motor having a motor shaft linked to the camera platform;
an encoder linked to the motor shaft;
a first feedback loop including the platform sensor, an amplifier, the motor, and an error calculator connected to the platform position controller and to an output from the platform sensor;
a second feedback loop including the encoder, the amplifier, the motor, and a derivative calculator connected to an output from the encoder; and
with the amplifier driving the motor based on the amplified sum of the output from the derivative calculator and the error calculator.

* * * * *